Sept. 16, 1941.   L. V. McCARTY   2,256,121
REFRIGERATOR CONTROL DEVICE
Filed Sept. 12, 1939   5 Sheets-Sheet 1

INVENTOR
L. V. McCarty
BY George Douglas Jones
ATTORNEY

Sept. 16, 1941.   L. V. McCARTY   2,256,121
REFRIGERATOR CONTROL DEVICE
Filed Sept. 12, 1939   5 Sheets-Sheet 2

INVENTOR
BY L. V. McCarty
George Douglas Jones
ATTORNEY

Sept. 16, 1941.　　　L. V. McCARTY　　　2,256,121
REFRIGERATOR CONTROL DEVICE
Filed Sept. 12, 1939　　　5 Sheets-Sheet 3

INVENTOR
L. V. McCarty
BY George Douglas Jones
ATTORNEY

Sept. 16, 1941.  L. V. McCARTY  2,256,121
REFRIGERATOR CONTROL DEVICE
Filed Sept. 12, 1939  5 Sheets-Sheet 4
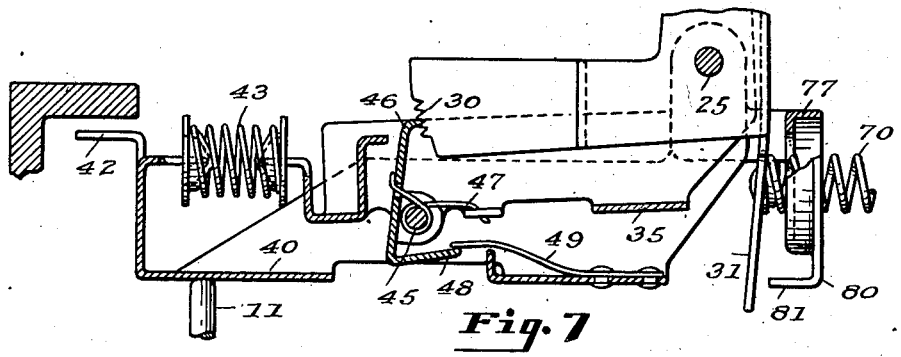
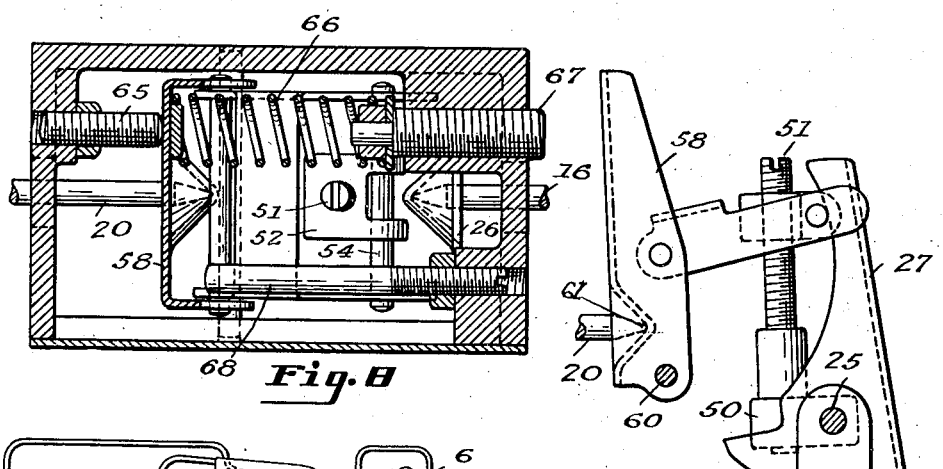
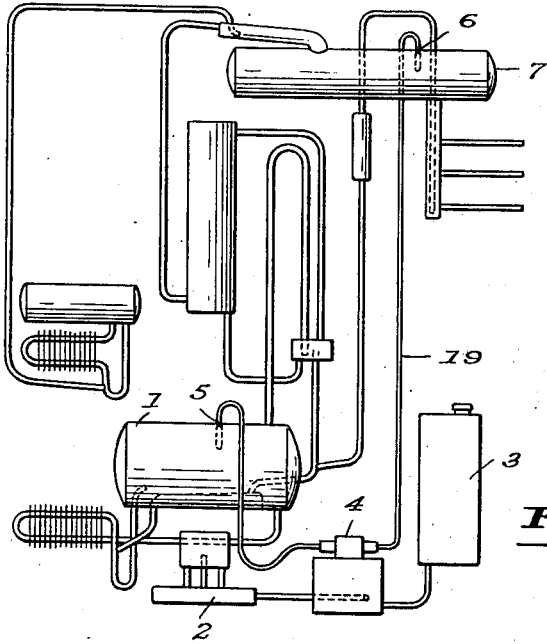
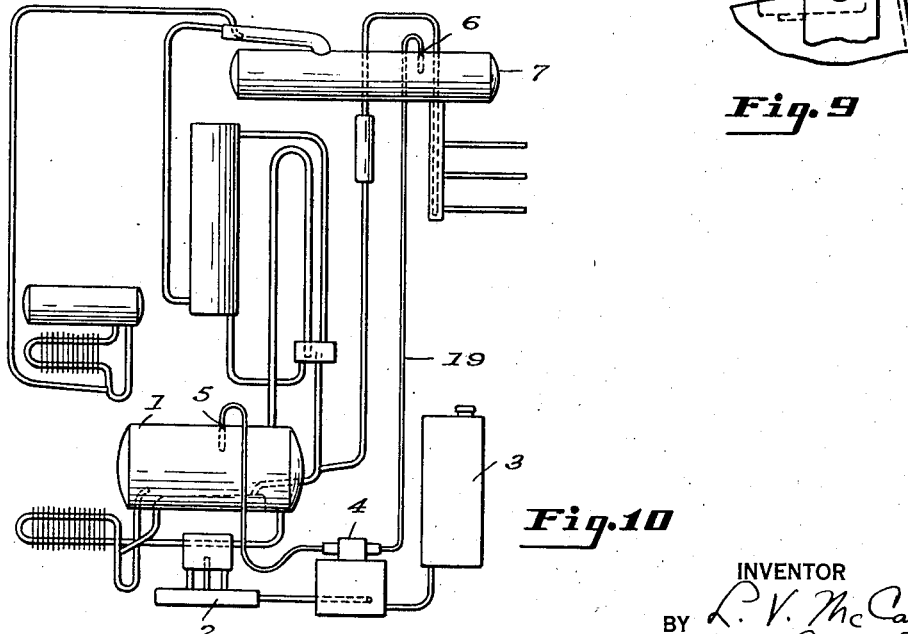
INVENTOR
BY L. V. McCarty
George Douglas Jones
ATTORNEY Patented Sept. 16, 1941

2,256,121

UNITED STATES PATENT OFFICE 2,256,121

REFRIGERATOR CONTROL DEVICE

Lourdes V. McCarty, Milwaukee, Wis., assignor to Edmund E. Allyne, Cleveland, Ohio Application September 12, 1939, Serial No. 294,567

7 Claims. (Cl. 62—5)

This invention relates to a thermostatic control device for refrigerators and more particularly to a mechanism influenced by the temperatures created in an intermittent absorption type refrigerating apparatus for turning on and off the fuel supply to the generator-absorber heating burner.

The present control is responsive to the temperature of the generator at all times; to the temperature of the evaporator during a portion of the refrigerating cycle and to the ambient or room temperature surrounding the refrigerator during the remainder of the cycle.

The instant mechanism operates by means of thermostatic bulbs to turn on the flow of gaseous or liquid fuel supplied to the burner under the influence of the evaporator temperature and to turn off the flow of fuel under the influence of the generator temperature with the turn-off biased by the ambient temperature, e. g., the room temperature.

Briefly stated, the mechanism hereinafter to be described in detail comprises thermostatic bulbs placed in the evaporator and adjacent the generator for controlling the mechanism of the well known intermittent absorption refrigerating cycle, wherein heat is applied to a generator by a burner to cause the temperature to rise therein and boil off aqueous ammonia solution, which is condensed and led to an evaporator. As the temperature of the generator and its associated thermostatic bulb rises, an increase in vapor pressure is created which communicates with an expanding bellows connected to a mechanism for closing the valve supplying the fuel to the burner. In the evaporator the liquefied ammonia absorbs heat from the surrounding space and passes into a gas which is again absorbed in the generator.

The evaporator bulb communicates with an expansion bellows which is responsive to ambient temperature and thus when the evaporator reaches a temperature higher than the ambient temperature, the thermostatic bulb is no longer responsive to the evaporator temperature, the bellows then being responsive to the ambient temperature. The evaporator expansion bellows prevents action by the ambient temperature when the evaporator or temperature is lower than the ambient temperature. Toward the end of the refrigerating cycle the evaporator temperature rises and when it reaches 25 to 50 degrees depending on position of adjusting knob 82, the evaporator thermostat expands with sufficient force to operate the mechanism to turn on the fuel supply for another generating period.

The arrangement utilized is such that the generator turn-off temperature is dependent entirely upon the ambient room temperature. For example, at 65° F. ambient temperature a generator temperature of approximately 277° F. is required to operate to turn off the fuel supply, while at 95° F. ambient temperature a generator temperature of approximately 366° F. is required. Above 95° F. ambient temperature, the required generator temperature to turn off is approximately 380° F. The expansion bellows communicating with both the generator and evaporator thermostats have their respective thrusts opposed to one another so that at any ambient temperature when the required temperature has been reached in the generator the thrust due to the generator bellows over-balances the thrust of the evaporator bellows causing the fuel valve to close. In this connection when using liquid fuel the flow of kerosene to the burner is cut-off but the burner is kept in operation for a period of 10 to 15 minutes by means of reservoir supply. After the flame of the burner dies out, the temperature of the generator falls causing a dropping pressure in the refrigerating system, and thus starts the refrigerating cycle. This decreased temperature likewise causes a decrease in the vapor pressure in the generator thermostat so that it is in the position for the next generating cycle.

During the refrigerating cycle the temperature of the evaporator drops to a point close to zero degrees Fahrenheit and due to the characteristics of the liquid used in the thermostat the temperature of the coldest spot in the thermostat determines the vapor pressure on the evaporator bellows. Thus the evaporator being colder than the ambient air the evaporator thermostat assumes control and causes a decrease in pressure in the evaporator thermostat bellows, and after a predetermined point has been reached the control mechanism comes into play and again turns on the fuel. This action is influenced by the warming up of the evaporator due to depletion of refrigerant toward the end of the refrigerating cycle.

The objects of the present control mechanism encompasses the automatic operation of the deflectors just described and these together with other objects and advantages will be apparent from the following detailed description.

In the drawings—

Fig. 7 is a fragmentary elevational view of a portion of the actuating mechanism with the valve on the point of opening;

Fig. 8 is a sectional plan view taken substantially on line 8—8 of Fig. 2;

Fig. 9 is a fragmentary elevational view of the actuating levers showing method of adjustment;

Fig. 10 is a diagrammatic view of a refrigerating system using the fuel control device.

Figure 1:
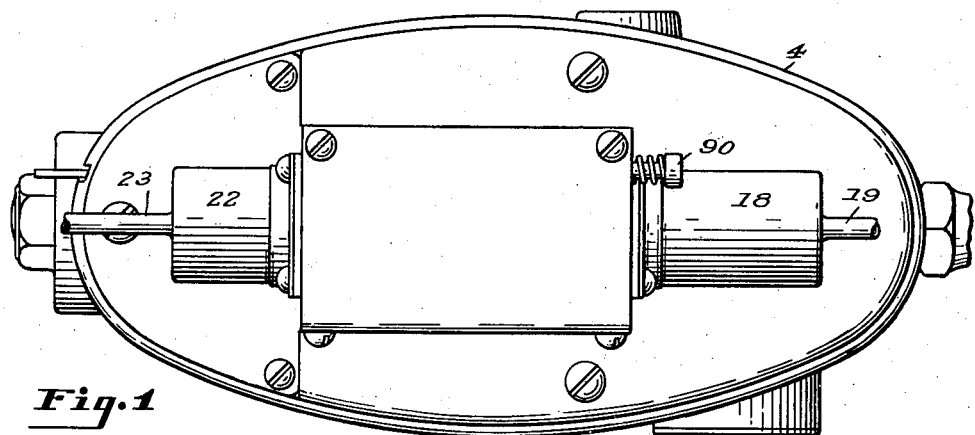
Fig. 1 is a top plan view of a fuel control device.

Referring to the diagrammatic representation in Fig. 10 of an intermittent absorption refrigerating system, a generator absorber 1 is heated by means of a fuel burner 2 receiving fuel from a tank 3. The flow of fuel to the burner is regulated by the automatic control mechanism 4 influenced through the medium of thermostatic bulb 5 secured to the generator absorber and thermostatic bulb 6 secured to the evaporator 7.

The automatic fuel control mechanism 4 includes a constant oil level feed chamber 10 communicating with fuel supply tank 3 and has mounted therein a vertically movable normally open needle valve 11 through which the fuel passes into the chamber and is discharged therefrom through opening 12 and thence to the burner 2.

The present mechanism is particularly designed to automatically open and close the needle valve 11 and the operating mechanism for accomplishing this is enclosed within a casing 15 positioned above the lower casing 10. The upstanding part of the casing 15 is apertured at opposite sides for the reception of a thrust rod 16 attached to expansion bellows 17 contained in an offset tubular casing 18 and communicating through pipe 19 to the thermostatic bulb 6 positioned in the evaporator.

The oppositely positioned thrust rod 20 is also mounted in an expansion bellows 21 secured in offset tubular casing 22 communicating through conduit 23 with the thermostatic bulb 5 positioned in the generator-absorber. While any of the well known thermostatic fluids may be used, it is preferable to charge the evaporator bulb with sulphur dioxide, and the generator bulb with toluene.

A horizontal pivot pin 25 is affixed in opposite side walls of the upper part of the casing and forms a pivot for several operating elements which will now be described. As shown in the several drawings a substantially L-shaped channel member or lever 26 having an upstanding portion 27 and a horizontal leg 28 is carried on said pivot pin 25 with a cone-shaped depression 29 formed in the vertically extending arm 27 for the reception of thrust rod 16, while rack teeth 30 are formed in the forward edge of the horizontal portion 28. The member 26 is formed with an integral depending portion 31 which extends below the arm 28 and is of slightly reduced width than the upper channel portion of element 26.

Embracing the member 26 and also pivoted to pin 25 is a depending forwardly extending channel-shaped plate 35 terminating in a pointed end 36. The member 35 also has an upwardly extending arm 37 lying parallel to the side of element 27.

Straddling members 26 and 35 is a second depending forwardly extending channel-like plate 40 which terminates beyond the end of plate 35. The forwardly upturned end of the plate 40 is split with the mid-portion 41 thereof inturned and tapered, while the edge portions 42 are outturned to form fingers. A snap acting coil spring 43 is positioned between the pointed ends 36 and 41 for a purpose to be hereinafter described.

Lying transversely between the upturned edges of the channel-shaped plate 35 is a pin 45 to which is pivoted a latch or dog 46 whose upper end is adapted to cooperate under certain conditions with the teeth 30 formed on the end of arm 28. A torsion spring 47 encircles the pin 45 to normally move the latch 46 counterclockwise. The lower inturned bottom portion 48 of the latch abuts a flat spring 49 riveted to plate 40.

Also carried on the pin 25 is a block 50 in which is mounted a vertically extending swivel screw 51 which in turn carries a nut 52 having rearwardly extending spaced arms 53 engaging pin 54 carried in opposite side bars 55. The side bars 55 are joined by a platform 56 with the opposite ends of the side bars pivoted to pin 57 supported in the sides of vertically extending channel member 58. This upstanding channel or yoke member is affixed to transverse pin 60 whose ends are journaled in the sides of the casing and has a conical depression 61 formed in its lower section for the reception of thrust rod 20 receiving movement from the generator thermostatic bellows 21.

An adjustable stop in 65 extends through one wall of the casing to regulate the position of yoke member 58, while the opposite side thereof is urged into engagement with the stop pin by means of coil spring 66 having an adjusting screw 67. Movement of the yoke is also limited by means of adjustable stop pin 68.

Referring again to the L-shaped member 26 and particularly to its depending portion or tongue 31, it will be observed that the tongue 31 is being normally urged in a clockwise movement by spring 70 whose opposite end contacts a button 71 secured to the end of vertically pivoted arm 72. The pivot for this arm is mounted in ears 73 formed on transverse plate 74 which extends across the casing. A second and larger spring 75 rests in depression 76 pressed from the plate 74 with the opposite end of the spring raising in a depression 77 pressed from the center of depending pivoted yoke 80. The yoke 80 is hung on the pivot 25 outside of the several other pivoted members previously described and extends downwardly to approximately the length of tongue 31. The end of the yoke 80 is outturned to form a flange 81 to cooperate with the lower part of the tongue 31. Movement of yoke 80 is limited by screw 85.

A regulating knob 82 carrying a screw 83 is screw-threaded through the side wall of the casing with the entire end of the screw abutting the edge of pivoted plate 72, and it is obvious that the tension of spring 70 may be varied by operating the knob to thus retard or advance the turning on point of the evaporator bellows.

A push button 90 is provided for manual control of the fuel turn-on. By pressing the button 90 its inner end engages the upper part of arm 37 and consequently pivots plate 35 downwardly to snap spring 43 and cause bottom channel member 40 to raise and permit the valve stem 11 to open in the same manner as that obtained by automatic engagement of the teeth 30 with the ratchet 46.

The required box temperature is ordinarily maintained by the automatic biasing action, before described, but manual control for use in cold rooms is obtained by adjustment of the evaporator temperature at which the burner is turned on. Control knob 82 is connected to adjusting screw 83, which acts against the pivoted adjusting lever 72, which changes the tension of turn-on spring 70. A clockwise rotation of control knob 82 increases the tension of spring 70 which provides an increased thrust opposed to the thrust of the evaporator power element, thus requiring a higher evaporator temperature to affect turn-on. Conversely a counterclockwise rotation of control knob 82 decreases tension of spring 70 which decreases the thrust opposed to the evaporator power element permitting turn-on at a lower evaporator temperature. The required turn-on temperatures are 27° F. for coldest position and 44° to 45° F. for warmest position.

Figure 2:
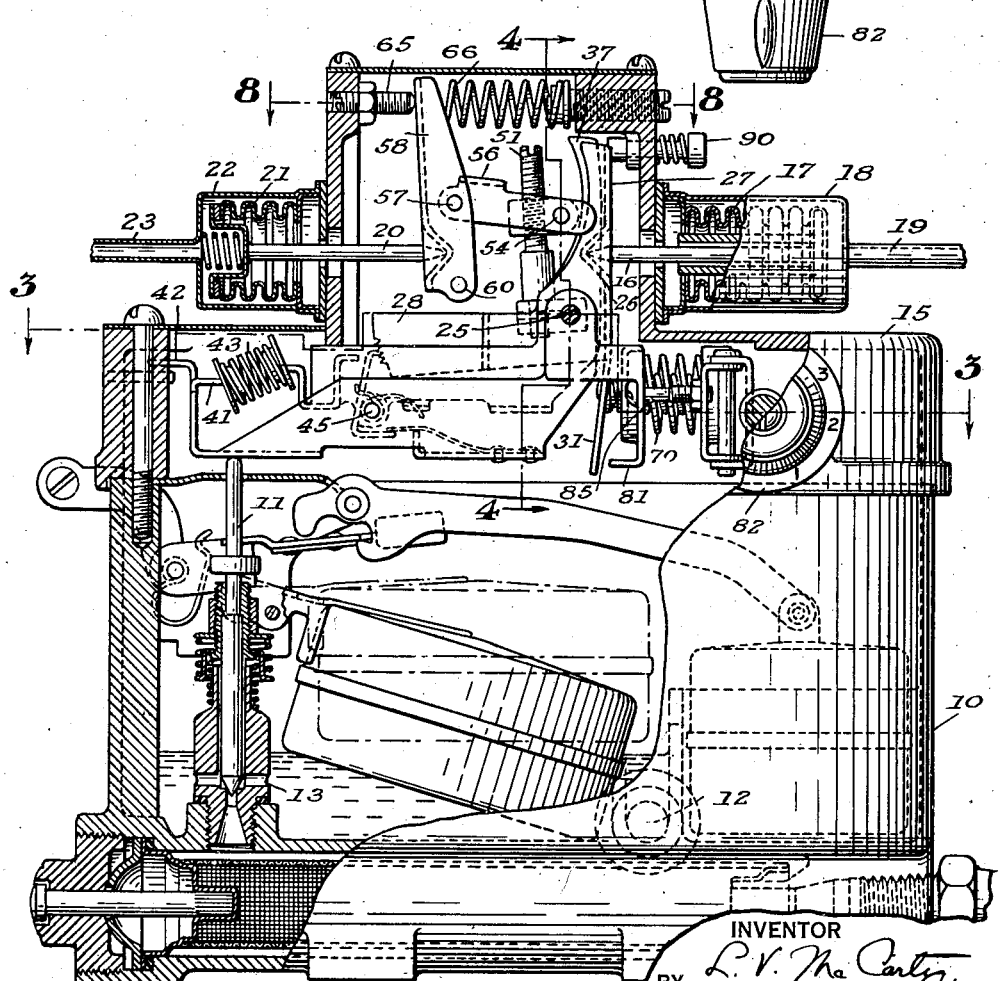
Fig. 2 is an elevational view of the fuel control device with parts broken away.
Figure 3:
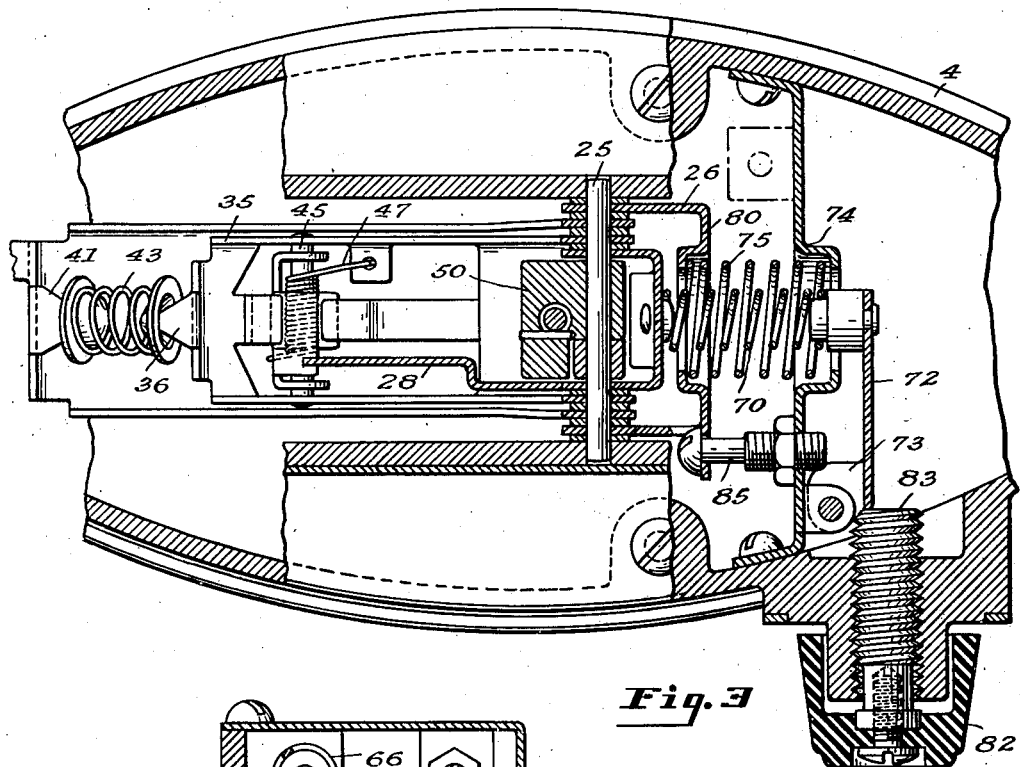
Fig. 3 is a sectional plan view taken substantially on the line 3—3 of Fig. 2.
Figure 4:
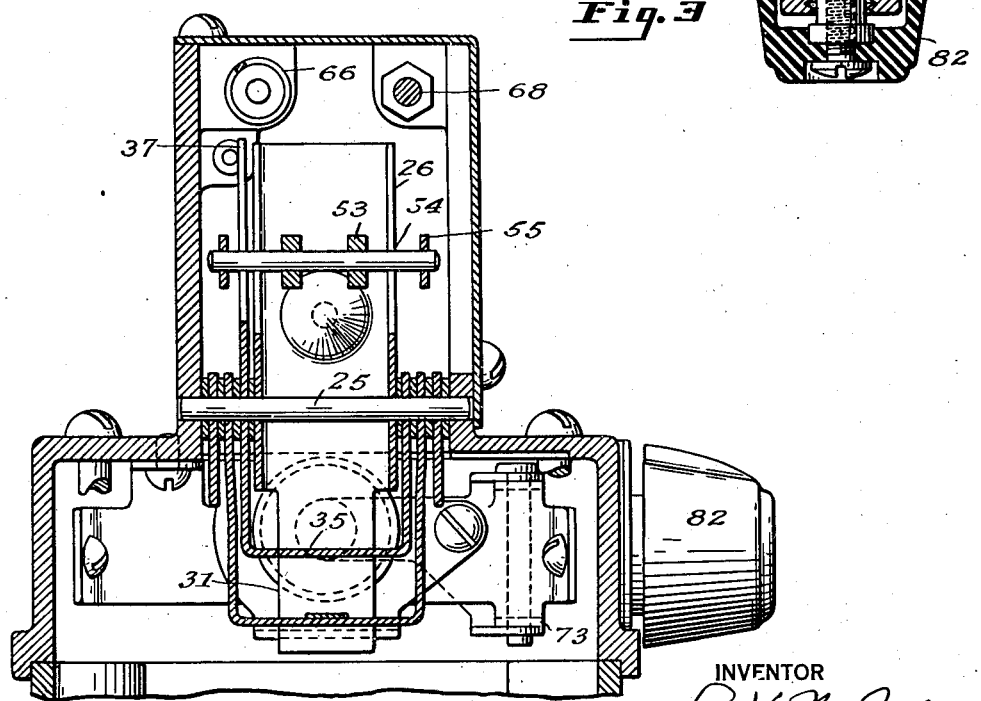
Fig. 4 is a vertical sectional view taken substantially on the line 4—4 of Fig. 2.
Figure 5:
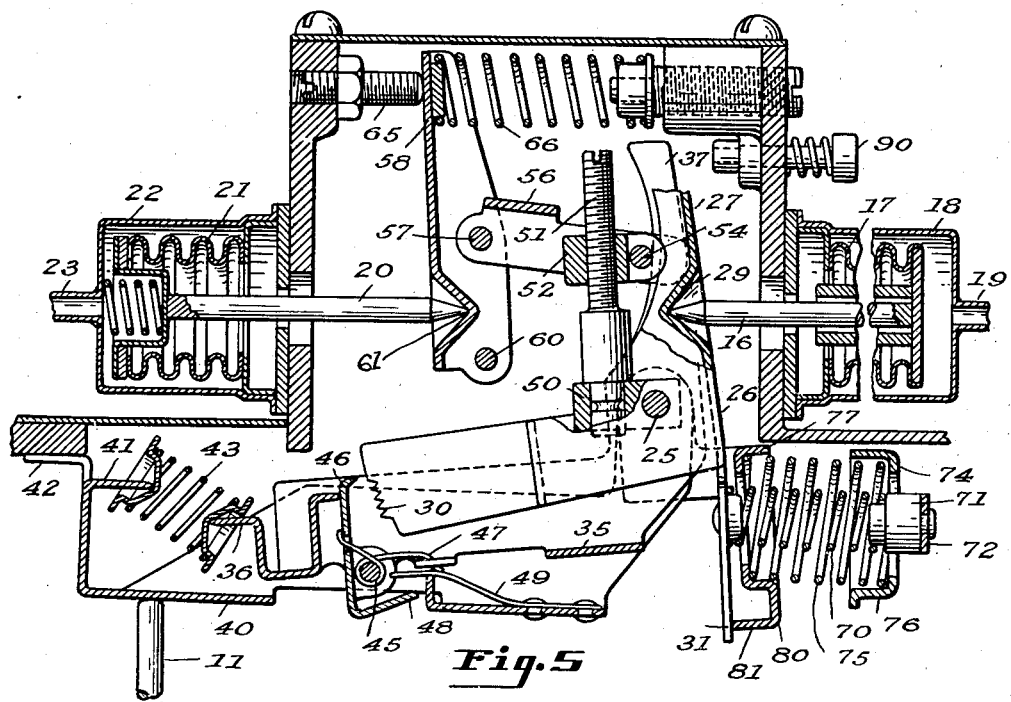
Fig. 5 is a fragmentary elevational view of the valve actuating mechanism shown with the valve open (burner on, generator starting to warm up)
Figure 6:
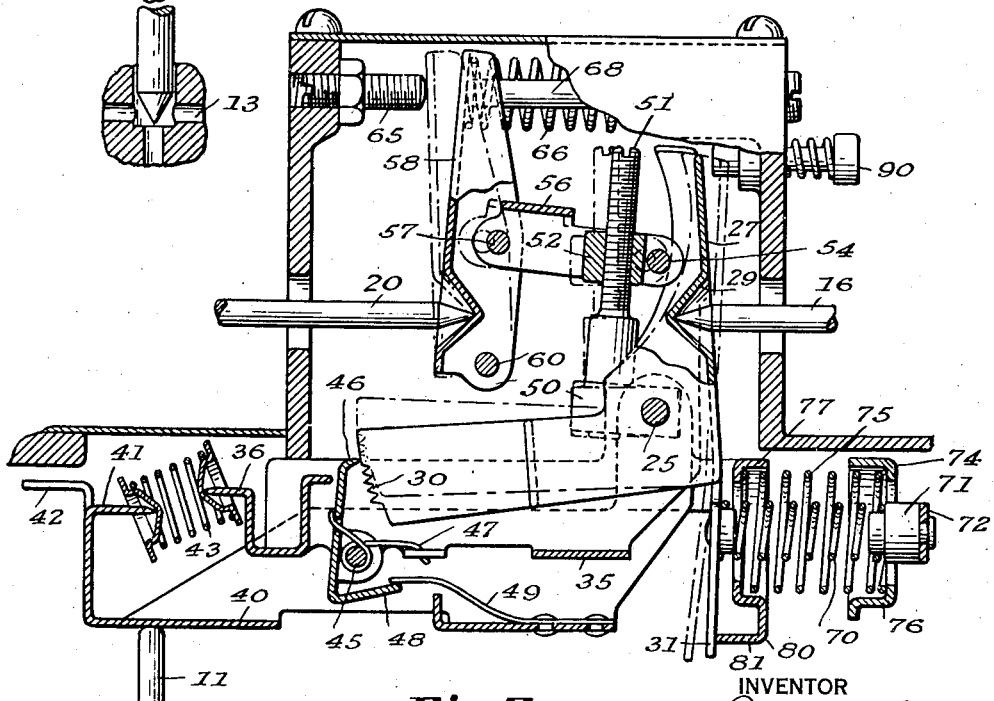
Fig. 6 is a fragmentary elevational view of the valve actuating mechanism shown with the valve closed, similar to Fig. 2 (with the burner just turned off and evaporator cooling off)

In operation when the evaporator thermostat 6 has expanded from the heat it will transmit the power to the bellows 17 and thrust rod 16, see Figs. 2 and 6. In both of these views the needle valve 11 is illustrated in depressed position to shut off the flow of oil to the burner and the valve is kept against its seat by contacting the upper end of the valve with the bottom of plate 40. In this closed position the outwardly extending fingers 42 on the plate 40 are in spaced relation to the upper part of the casing and the snap spring 43 is applying downward pressure against the point 41 and the latch 46 is resting against the bottom rack tooth 30. This condition was brought about by the fluid in the generator thermostat being heated to such an extent that enough thrust was created in rod 20 to overcome the thrust in rod 16. When this occurs the inward movement of the rod moves the yoke 58 in a clockwise manner causing pin 54 to move horizontally against extending arm 37, which is an integral part of bottom channel plate 35, and thus carries the outer end 36 thereof in an upwardly direction to cause the snap acting spring 43 to reverse its position and force the lower pivoted plate 40 downwardly against the valve 11 to close the same. When the generator thermostat turns off the supply, as thus described, the parts are in the relation shown in solid lines in Fig. 6. In closed position during the middle of the absorbing period the latch 46 is in engagement with the lowermost rack tooth 30 on the arm 28 and remains in this position due to the contact of spring 49 against lower edge 48, as shown in dotted lines in Fig. 6.

After the generator burner has ceased functioning and the generator partially cools, refrigeration is resumed and continues until the supply of refrigerant is exhausted when the evaporator heats up and expands the fluid in the evaporator thermostat and the thrust rod 16 forces the upper arm 27 of member 26 in a counterclockwise condition. This moves the latch 46 downwardly and because of its arcuate movement permits the end 48 to disengage itself from spring 49 and consequently withdraws the latch 46 from engagement with the teeth 30 and under the influence of coil spring 45 pivots the latch member against the upward bend in the plate 35 which in turn moves the plate 35 downwardly and causes the spring 43 to snap and raise the plate 40 from engagement with the fuel valve. As soon as pressure is relieved on the valve it is spring opened.

To recapitulate, when the generator reaches the proper turn-off heat the generator bellows rod presses the upper yoke 58 to force the plate 35 and rack assembly, clockwise until the toggle snap spring 43 operates and moves the plate 40 downwardly to close valve 11. After the fuel is turned off the pawl spring 49 forces the latch 46 into contact with rack 30. When the generator starts to cool off and the pressure drops, the refrigerating cycle starts and consequently the generator thermostatic bellows collapse. Thereupon the yoke lever 58 assisted by spring 66 returns to its original position abutting set screw 65 where it remains until the next generating cycle.

The evaporator being cold contracts the fluid in its thermostatic bellows which causes spring 70 to move lever 26 clockwise until it rests against the casing at the top thereof, as shown in dotted lines in Fig. 6. During this movement the latch 46 slips past the teeth 30 on arm 28, as shown in Fig. 2. As the lever 26 starts to move in a clockwise direction the ambient spring 75 abuts its stop screw and ceases to be active so that only the turn-on spring 70 is in active position.

However, when the evaporator heats up, its thermostatic rod begins to force lever 26 backward in a counterclockwise direction to its original position and at a predetermined temperature the lower tooth of the rack 30 becomes engaged with the pawl 46. Continued movement of lever 26 forces plate 35 downwardly to trip the snap spring 43 and thus raise plate 40 to open the fuel valve 11. At this point the pawl 46 becomes disengaged from the teeth 30 by action of the spring 49.

Figure 11:
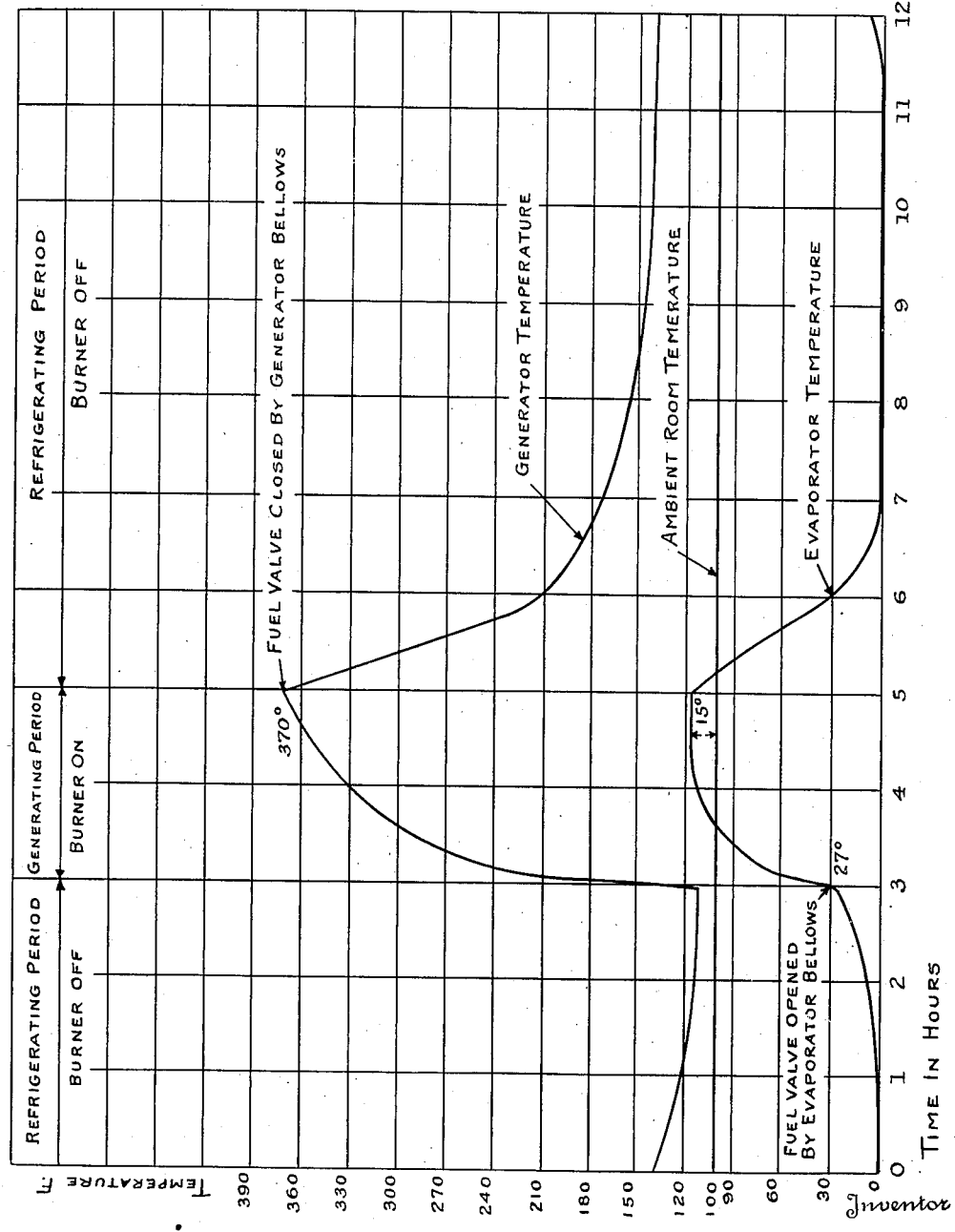
Fig. 11 is a chart of the various time periods and temperatures involved, showing the absorbing and generating periods.

Referring now to Fig. 11 of the drawings, there is disclosed a chart designated as to time and temperature of the several functions and periods comprising the refrigerating cycle, and, as before pointed out, the salient functions of the present method and apparatus are threefold:

First, the turn-off of the fuel valve at a predetermined generator temperature.

Second, the turn-on of the fuel valve at a predetermined evaporator temperature.

Third, the automatic biasing or modifying of the fuel valve turn-off operations in accordance with the then existing ambient or room temperature for the purpose of giving proper box temperature control.

Function 1 is accomplished by means of the generator thermostatic bellows, while functions 2 and 3 are accomplished by the evaporator thermostatic bellows. In further explanation of the refrigeration cycle and with reference to the chart disclosed in Fig. 11, an understanding is desirable of the refrigerating box temperature control and the evaporator temperature characteristics.

Box temperature control is effected by regulating the amount of refrigerant driven over each generating period which in turn is dependent on the maximum generator temperature when the burner goes out. The hotter the room, the more refrigerant needed, so the maximum generator temperature at heat off should be higher than in cooler rooms. To provide adequate refrigeration in a 100° F. room, the maximum generator temperature at heat off should be about 370° F., and to avoid subfreezing the food compartment in a 60° F. room, when less refrigeration is needed, the maximum generator temperature should be about 275° F. Proper shut-offs at intermediate room temperatures form approximately a straight line on a graph.

The evaporator temperature characteristics during one complete cycle is composed of a generating (burner on) period and an absorbing (burner out) period. The evaporator temperature, where the thermostatic bulb of the evaporator bellows is located, is alternately below and above room temperature, i. e., during the absorbing period the evaporator temperature goes down to nearly 0° F., and during the generating period the evaporator temperature goes up above room temperature and stays there until after the burner is off—always about 15° F. above room temperature regardless of what the room temperature is. To illustrate, the evaporator temperature when the burner goes out is about 75° F. in a 60° F. room, and about 115° F. in a 100° F. room. See chart #2. It is important to understand this for it is only because of this characteristic that it is possible to combine the two functions (2 and 3 above) in one bellows, to be explained forthwith.

The dual functions (2 and 3 above) are performed by the evaporator bellows, bulb, and connecting capillary tubing which have been vapor-filled under pressure. Condensing of this vapor takes place at the coldest spot of the bellows-bulb system, or in other words, the pressure in the evaporator bellows is governed by the coldest temperature to which any part of said system is subjected.

As the control mechanism in which the bellows are mounted, is located at the front of the refrigerator cabinet near the floor, the evaporator bellows is always at room temperature for there is practicaly no reflected heat in this position from the burner or other warm unit parts. The connecting capillary tubing, going up the back of the cabinet in the stack, is always above room temperature by reason of reflected heat from the several warm unit parts. The evaporator bulb, however, is alternately above and below room temperature, as explained above; or in other words, alternately above and below the bellows temperature because the latter is always at room temperature.

During the absorption period, the thermostatic bulb, being nearly 0° F., governs the pressure in the evaporator bellows and the control is so designed that the evaporator bellows will open the fuel valve when the evaporator eventually warms up to the predetermined temperature of 27° F. which at that time is still the coldest part of the evaporator bellows-bulb system. As the generating period progresses, the evaporator and evaporator bulb warm up to about 15° F. above room temperature and this differential exists until after the burner goes out and leaves the bellows, which is at room temperature, the coldest part in the bellows-bulb system.

It is only at the end of the heating period that the function of biasing the fuel shut-off comes into play, and the control is so designed that the pressure in the evaporator bellows opposes the shut-off action of the generator bellows. Therefore, the warmer the room temperature, say 90° F., the greater the pressure in the evaporator bellows, so that the generator temperature must go higher in order for the generator bellows to overcome that opposing force and shut off the fuel valve. Conversely, if the room is 70 F. at the end of the heating period, there is less pressure in the evaporator bellows. Consequently, the generator bellows closes the fuel valve at a lower generator temperature as the opposing force of the evaporator bellows is not as great as in a 90° F. room.

In this manner, the evaporator bellows performs the dual functions of opening the fuel valve at a predetermined evaporator temperature and automatically biasing the closing of the fuel valve according to the then existing room temperature for the purpose of box temperature control.

What I claim is:

1. In a method of control for intermittent absorption refrigeration systems, the combination of temperature influenced means for turning on and turning off the heat supplied to said system together with means to bias the turning off of said heat supply, said means comprising the temperature influenced turn on means.

2. In an intermittent absorption refrigeration apparatus having a generator, a heating means therefor, and an evaporator connected in operative relation, the combination of thermostatically operated means influenced by the temperatures of said generator and said evaporator and adapted to turn off and turn on, respectively, the said heating means, the said turn of of said heating means being retarded by an increase in the ambient temperature surrounding said system through the medium of said evaporator thermostatically operated means.

3. In an intermittent absorption refrigeration apparatus including a generator and evaporator connected in operative relation, a heating element for said generator and thermostatic devices for turning on and turning off the said heating element, the said thermostatic device adapted to turn off said heating element being biased by the ambient temperature acting on the thermostatic device for turning on said heating element to advance or retard its operation.

4. An intermittent absorption refrigerating apparatus including a generator, a heating means therefor and an evaporator, the combinatin therewith of a thermostatically operated means associated with said heating means for turning on and turning off the same and operated by the heat of the generator to turn off and by the heat of the evaporator to turn on, the thermostatically operated device operated by the said evaporator being rendered operative by an increase in ambient temperature whereby said thermostatic device operated by said generator will be prevented from turning off said heating means until the optimum generator temperature is reached for the then existing ambient temperature.

5. In an intermittent absorption refrigerating apparatus, an evaporator, a generator, a fuel burner therefor and a fuel supply valve for said burner, the combination therewith of a thermostatically operated means for opening and closing said supply valve, said thermostatic means including an expanding bellows influenced by the heat of said generator to close said valve and an expanding bellows influenced by the heat of said evaporator to open said valve, the said evaporator bellows adapted to be also influenced by an increase in ambient temperature to create a bias on said generator bellows and retard its action in closing said valve.

6. In an intermittent absorption refrigerating apparatus including an evaporator, a generator, a fuel burner therefor and a fuel supply valve for said burner, the combination comprising a thermostatic bellows and push rod operated by the heat of said generator for closing said valve and a thermostatic bellows and push rod normally operated by the heat of said evaporator for opening said valve, a spring biased pivoted lever connected to said valve and rocked by the thrust action of said push rods to open and close the valve, the said thermostatic bellows and push rod operated by said evaporator being influenced by ambient temperature to increase the force on its push rod to retard the operation of the generator bellows push rod.

7. In an intermittent absorption refrigerating apparatus including an evaporator, a generator, a fuel burner therefor and a fuel supply valve for said burner, the combination comprising a thermostatic bellows and push rod operated by the heat of said generator for closing said valve and a thermostatic bellows and push rod normally operated by the heat of said evaporator for opening said valve, a spring biased pivoted lever connected to said valve and rocked by the thrust action of said push rods to open and close the valve, the said thermostatic bellows and push rod operated by said evaporator being influenced by ambient temperature to increase the force on its push rod to retard the operation of the generator bellows push rod at the end of the heating period.

LOURDES V. McCARTY.